United States Patent
Asai et al.

(10) Patent No.: US 12,119,514 B2
(45) Date of Patent: Oct. 15, 2024

(54) SLURRY COMPOSITION FOR NON-AQUEOUS SECONDARY BATTERY FUNCTIONAL LAYER, SEPARATOR FOR NON-AQUEOUS SECONDARY BATTERY, AND NON-AQUEOUS SECONDARY BATTERY

(71) Applicant: ZEON CORPORATION, Tokyo (JP)

(72) Inventors: Kazuki Asai, Tokyo (JP); Yasuhiro Akita, Tokyo (JP); Kenya Sonobe, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 665 days.

(21) Appl. No.: 17/268,479

(22) PCT Filed: Aug. 21, 2019

(86) PCT No.: PCT/JP2019/032534
§ 371 (c)(1),
(2) Date: Feb. 15, 2021

(87) PCT Pub. No.: WO2020/040163
PCT Pub. Date: Feb. 27, 2020

(65) Prior Publication Data
US 2021/0184313 A1     Jun. 17, 2021

(30) Foreign Application Priority Data
Aug. 24, 2018  (JP) ................. 2018-157497

(51) Int. Cl.
*H01M 50/446* (2021.01)
*H01M 10/0525* (2010.01)
*H01M 50/409* (2021.01)
*H01M 50/417* (2021.01)
*H01M 50/423* (2021.01)
*H01M 50/443* (2021.01)
*H01M 50/454* (2021.01)
*H01M 10/0566* (2010.01)

(52) U.S. Cl.
CPC ..... *H01M 50/446* (2021.01); *H01M 10/0525* (2013.01); *H01M 50/409* (2021.01); *H01M 50/417* (2021.01); *H01M 50/423* (2021.01); *H01M 50/443* (2021.01); *H01M 50/454* (2021.01); *H01M 10/0566* (2013.01); *H01M 2300/0025* (2013.01)

(58) Field of Classification Search
CPC ............ H01M 50/446; H01M 50/454; H01M 50/417; H01M 50/443; H01M 50/423; H01M 50/409; H01M 10/0525; H01M 10/0566; H01M 2300/0025
See application file for complete search history.

(56) References Cited

U.S. PATENT DOCUMENTS

| | | |
|---|---|---|
| 9,178,198 B2 | 11/2015 | Yeou et al. |
| 9,905,824 B2 | 2/2018 | Ryu et al. |
| 10,522,806 B2 | 12/2019 | Takamatsu et al. |
| 2015/0179998 A1 | 6/2015 | Kagami et al. |
| 2016/0240887 A1* | 8/2016 | Hatta ............... H01M 10/4257 |
| 2017/0155107 A1* | 6/2017 | Akiike .............. H01M 50/403 |
| 2018/0351149 A1* | 12/2018 | Akiike .............. H01M 10/058 |
| 2019/0207189 A1* | 7/2019 | Arai .................. H01M 50/417 |

FOREIGN PATENT DOCUMENTS

| | | |
|---|---|---|
| CN | 103456910 A | 12/2013 |
| CN | 105594014 A | 5/2016 |
| CN | 107925039 A | 4/2018 |
| EP | 3748746 A1 | 12/2020 |
| JP | 2015118841 A | 6/2015 |
| JP | 2015144084 A | 8/2015 |
| JP | 2018092701 * | 6/2018 |
| JP | 2018092701 A | 6/2018 |
| JP | 2018106865 A | 7/2018 |
| WO | 2015097952 A1 | 7/2015 |
| WO | 2016157770 A1 | 10/2016 |
| WO | 2017094252 A1 | 6/2017 |
| WO | WO 2017094252 * | 6/2017 |
| WO | 2018037867 A1 | 3/2018 |
| WO | WO 2018037867 * | 3/2018 |

OTHER PUBLICATIONS

Decision of JPO to grant a Patent for Application 2020-538416 (Year: 2024).*
Sep. 17, 2019, International Search Report issued in the International Patent Application No. PCT/JP2019/032534.
Mar. 2, 2021, International Preliminary Report on Patentability issued in the International Patent Application No. PCT/JP2019/032534.
Apr. 7, 2022, The Extended European Search Report issued by the European Patent Office in the corresponding European Patent Application No. 19852575.0.

* cited by examiner

*Primary Examiner* — Alexander Usyatinsky
(74) *Attorney, Agent, or Firm* — KENJA IP LAW PC

(57) ABSTRACT

Provided is a slurry composition for a functional layer that can form a functional layer capable of closely adhering strongly to a separator substrate and that can enhance rate characteristics of a secondary battery including a separator that includes the functional layer. The slurry composition for a functional layer contains a binder and a melamine compound. The binder is a polymer including at least one functional group selected from the group consisting of a carboxy group, a hydroxyl group, an amino group, an epoxy group, an oxazoline group, a sulfo group, a nitrile group, and an amide group. The melamine compound has a volume-average particle diameter of not less than 20 nm and not more than 300 nm and constitutes a proportion of not less than 0.5 mass % and not more than 85 mass % among the total of the binder and the melamine compound.

9 Claims, No Drawings ized particles_SLURRY COMPOSITION FOR NON-AQUEOUS SECONDARY BATTERY FUNCTIONAL LAYER, SEPARATOR FOR NON-AQUEOUS SECONDARY BATTERY, AND NON-AQUEOUS SECONDARY BATTERY

TECHNICAL FIELD

The present disclosure relates to a slurry composition for a non-aqueous secondary battery functional layer, a separator for a non-aqueous secondary battery, and a non-aqueous secondary battery.

BACKGROUND

Non-aqueous secondary batteries (hereinafter, also referred to as "secondary batteries") such as lithium ion secondary batteries have characteristics such as compact size, light weight, high energy density, and the ability to be repeatedly charged and discharged, and are used in a wide variety of applications.

A secondary battery typically includes electrodes (positive electrode and negative electrode) and a separator that isolates the positive electrode and the negative electrode from each other and prevents short-circuiting between the positive and negative electrodes. In one example of a conventionally used separator, the separator includes a layer for imparting a specific function to a battery member, such as a porous membrane layer for improving heat resistance and strength, or an adhesive layer aimed at improving adhesiveness with an electrode (hereinafter, such layers are also referred to by the general term "functional layer for a non-aqueous secondary battery" or "functional layer"), on the surface of a separator substrate (for example, refer to Patent Literature (PTL) 1).

A functional layer is formed by, for example, applying a slurry composition for a non-aqueous secondary battery functional layer that contains components such as a binder onto a substrate such as a separator substrate, and then drying a coating film on the substrate.

PTL 1, for example, discloses a technique of forming a porous membrane on a separator substrate using a composition that contains non-conductive particles, an acid group-containing polymer having a total acid group content that is within a specific range, and a carbodiimide compound. According to PTL 1, low-temperature output characteristics and cycle characteristics of a lithium ion secondary battery can be improved by using a separator that includes this porous membrane.

CITATION LIST

Patent Literature

PTL 1: JP2015-144084A

SUMMARY

Technical Problem

With regards to a separator including the conventional functional layer described above, there has been demand for closely adhering the functional layer and a separator substrate more strongly while also causing a secondary battery to display even better rate characteristics.

Accordingly, one object of the present disclosure is to provide a slurry composition for a non-aqueous secondary battery functional layer that can form a functional layer capable of closely adhering strongly to a separator substrate and that can enhance rate characteristics of a non-aqueous secondary battery including a separator that includes the functional layer.

Another object of the present disclosure is to provide a separator for a non-aqueous secondary battery in which a functional layer and a separator substrate are closely adhered strongly and that can cause a non-aqueous secondary battery to display excellent rate characteristics.

Yet another object of the present disclosure is to provide a non-aqueous secondary battery that has excellent rate characteristics.

Solution to Problem

The inventors conducted diligent investigation with the aim of solving the problems set forth above. The inventors discovered that by forming a functional layer on a separator substrate using a slurry composition that contains a binder formed of a polymer including a specific functional group and a melamine compound having a volume-average particle diameter within a specific range and in which the proportion constituted by the melamine compound among the total of the binder and the melamine compound is within a specific range, the functional layer can be closely adhered strongly to the separator substrate while also causing a secondary battery to display excellent rate characteristics through a separator that includes the functional layer. In this manner, the inventors completed the present disclosure.

Specifically, the present disclosure aims to advantageously solve the problems set forth above, and a presently disclosed slurry composition for a non-aqueous secondary battery functional layer comprises a binder and a melamine compound, wherein the binder is a polymer including at least one functional group selected from the group consisting of a carboxy group, a hydroxyl group, an amino group, an epoxy group, an oxazoline group, a sulfo group, a nitrile group, and an amide group, the melamine compound has a volume-average particle diameter of not less than 20 nm and not more than 300 nm, and the melamine compound constitutes a proportion of not less than 0.5 mass % and not more than 85 mass % among a total of the binder and the melamine compound. By using a slurry composition that contains a binder formed of a polymer including at least any one of the functional groups set forth above and a melamine compound having a volume-average particle diameter within the specific range set forth above and in which the proportion constituted by the melamine compound among the total of the binder and the melamine compound is within the specific range set forth above in this manner, it is possible to produce a functional layer that can closely adhere strongly to a separator substrate. Moreover, by using a separator that includes this functional layer, it is possible to cause a secondary battery to display excellent rate characteristics.

Note that the "volume-average particle diameter" of a melamine compound referred to in the present disclosure can be measured by a method described in the EXAMPLES section of the present specification.

In the presently disclosed slurry composition for a non-aqueous secondary battery functional layer, the binder preferably has a volume-average particle diameter of not less than 20 nm and not more than 300 nm. When the volume-average particle diameter of the binder is within the range set forth above, a functional layer can be closely adhered to a separator substrate more strongly while also further improving rate characteristics of a secondary battery.

Note that the "volume-average particle diameter" of a binder referred to in the present disclosure can be measured by a method described in the EXAMPLES section of the present specification.

The presently disclosed slurry composition for a non-aqueous secondary battery functional layer can further comprise non-conductive particles. By forming a functional layer using the slurry composition containing non-conductive particles, it is possible to improve heat resistance and strength of a separator that includes the functional layer.

Moreover, the present disclosure aims to advantageously solve the problems set forth above, and a presently disclosed separator for a non-aqueous secondary battery comprises: a separator substrate; and a functional layer on the separator substrate, wherein the functional layer is a dried product of any one of the slurry compositions for a non-aqueous secondary battery functional layer set forth above. A functional layer that is obtained through drying of any one of the slurry compositions set forth above can closely adhere strongly to a separator substrate. Moreover, by using a separator that includes this functional layer, it is possible to cause a secondary battery to display excellent rate characteristics.

In the presently disclosed separator for a non-aqueous secondary battery, a portion of the dried product is preferably present in an inner part of the separator substrate. In the presently disclosed separator that includes a separator substrate and a functional layer formed of a dried product of a slurry composition, the functional layer can be closely adhered to the separator substrate more strongly in a case in which the dried product of the slurry composition forms the functional layer and is also, continuously with the functional layer, present in an inner part of the separator substrate.

Note that it is possible to confirm that "a portion of a dried product of a slurry composition for a non-aqueous secondary battery functional layer is present in an inner part of a separator substrate" by a method described in the EXAMPLES section of the present specification.

In the presently disclosed separator for a non-aqueous secondary battery, the separator substrate is preferably a microporous membrane containing either or both of a polyolefin resin and an aromatic polyamide resin or a non-woven fabric containing either or both of a polyolefin resin and an aromatic polyamide resin. By using a microporous membrane containing a polyolefin resin and/or an aromatic polyamide resin or a non-woven fabric containing a polyolefin resin and/or an aromatic polyamide resin as the separator substrate, cycle characteristics of a secondary battery can be enhanced while also further improving rate characteristics of the secondary battery.

Furthermore, the present disclosure aims to advantageously solve the problems set forth above, and a presently disclosed non-aqueous secondary battery comprises a positive electrode, a negative electrode, a separator, and an electrolyte solution, wherein the separator is any one of the separators for a non-aqueous secondary battery set forth above. A secondary battery that includes any one of the separators for a non-aqueous secondary battery set forth above has excellent rate characteristics.

Advantageous Effect

According to the present disclosure, it is possible to provide a slurry composition for a non-aqueous secondary battery functional layer that can form a functional layer capable of closely adhering strongly to a separator substrate and that can enhance rate characteristics of a non-aqueous secondary battery including a separator that includes the functional layer.

Moreover, according to the present disclosure, it is possible to provide a separator for a non-aqueous secondary battery in which a functional layer and a separator substrate are closely adhered strongly and that can cause a non-aqueous secondary battery to display excellent rate characteristics.

Furthermore, according to the present disclosure, it is possible to provide a non-aqueous secondary battery having excellent rate characteristics.

DETAILED DESCRIPTION

The following provides a detailed description of embodiments of the present disclosure.

The presently disclosed slurry composition for a non-aqueous secondary battery functional layer can be used to form a functional layer having a function such as reinforcement and/or adhesion inside a non-aqueous secondary battery. Moreover, the presently disclosed separator for a non-aqueous secondary battery includes a separator substrate and a functional layer formed using the presently disclosed slurry composition for a non-aqueous secondary battery functional layer at at least one side of the separator substrate. Furthermore, the presently disclosed non-aqueous secondary battery includes the presently disclosed separator for a non-aqueous secondary battery.

(Slurry Composition for Non-Aqueous Secondary Battery Functional Layer)

The presently disclosed slurry composition is a composition containing a binder and a melamine compound that are dissolved and/or dispersed in a solvent. Note that the presently disclosed slurry composition may contain components other than the binder, the melamine compound, and the solvent (i.e., other components).

The binder contained in the presently disclosed slurry composition is a polymer that includes at least one functional group selected from the group consisting of a carboxy group, a hydroxyl group, an amino group, an epoxy group, an oxazoline group, a sulfo group, a nitrile group, and an amide group. The melamine compound contained in the presently disclosed slurry composition has a volume-average particle diameter within a range of 20 nm to 300 nm. Moreover, in the presently disclosed slurry composition, the proportion constituted by the amount of the melamine compound among 100 mass %, in total, of the amount of the binder and the amount of the melamine compound is not less than 0.5 mass % and not more than 85 mass %.

By providing a functional layer formed of a dried product of the presently disclosed slurry composition on a separator substrate, it is possible to closely adhere a functional layer and a separator substrate of a separator strongly to each other. Moreover, it is possible to cause a secondary battery to display excellent rate characteristics by using this separator. Although it is not clear why close adherence of a functional layer and a separator substrate can be increased while also causing a secondary battery to display excellent rate characteristics by forming the functional layer using the presently disclosed slurry composition, the reason for this is presumed to be as follows.

As a consequence of the amount of the melamine compound constituting not less than 0.5 mass % and not more than 85 mass % among the total amount of the binder and the melamine compound in the presently disclosed slurry composition, the melamine compound and the binder, which includes any of the aforementioned functional groups, act in conjunction to display excellent binding capacity, which is presumed to be a result of good interactions, such as hydrogen bonding, between the melamine compound and the binder.

Moreover, as a consequence of the melamine compound contained in the presently disclosed slurry composition having a volume-average particle diameter that is within the aforementioned range, the melamine compound can display good dispersibility. When the melamine compound can be well dispersed in this manner, uneven distribution of the binder that can interact with the melamine compound can also be inhibited, and thus a functional layer in which components such as the binder and the melamine compound are uniformly dispersed can be formed on a separator substrate.

Furthermore, the contributions of interactions between the melamine compound and the binder and improvement of dispersibility of melamine are thought to act together to enable strong close adherence to a separator substrate of a functional layer that is formed using the slurry composition and to cause a secondary battery that includes the functional layer to display excellent battery characteristics (rate characteristics, etc.).

<Binder>

The binder is a component that imparts adhesiveness to a functional layer that is formed on the surface of a separator using the slurry composition.

<<Type of Binder>>

The binder can be any polymer that includes a specific functional group described below without any specific limitations. For example, a polymer obtained through polymerization of a monomer composition containing a monomer that can display binding capacity (synthetic macromolecule such as an addition polymer obtained through addition polymerization) can be used as the binder. Examples of such polymers include an aliphatic conjugated diene/aromatic monovinyl copolymer (polymer including mainly an aliphatic conjugated diene monomer unit and an aromatic monovinyl monomer unit), an acrylic polymer (polymer including mainly a (meth)acrylic acid alkyl ester monomer unit), a fluoropolymer (polymer including mainly a fluorine-containing monomer unit), an acrylic acid/acrylamide copolymer (polymer including mainly a (meth)acrylic acid unit and a (meth)acrylamide unit), and an acrylonitrile polymer (polymer including mainly a (meth)acrylonitrile unit). One of these polymers may be used individually, or two or more of these polymers may be used in combination in a freely selected ratio. Of these polymers, an aliphatic conjugated diene/aromatic monovinyl copolymer, an acrylic acid/acrylamide copolymer, an acrylonitrile polymer, and an acrylic polymer are preferable, and an acrylic polymer is more preferable.

Examples of aliphatic conjugated diene monomers that can form an aliphatic conjugated diene monomer unit of the aliphatic conjugated diene/aromatic monovinyl copolymer, aromatic monovinyl monomers that can form an aromatic monovinyl monomer unit of the aliphatic conjugated diene/aromatic monovinyl copolymer, (meth)acrylic acid alkyl ester monomers that can form a (meth)acrylic acid alkyl ester monomer unit of the acrylic polymer, and fluorine-containing monomers that can form a fluorine-containing monomer unit of the fluoropolymer include known examples thereof.

The phrase "includes a monomer unit" as used in the present disclosure means that "a polymer obtained with the monomer includes a repeating unit derived from the monomer".

Note that when a polymer is said to "mainly include" one type of monomer unit or a plurality of types of monomer units in the present disclosure, this means that "when the amount of all repeating units included in the polymer is taken to be 100 mass %, the proportional content of the one type of monomer unit or the total proportional content of the plurality of types of monomer units is more than 50 mass %".

Also note that in the present disclosure, "(meth)acryl" is used to indicate "acryl" and/or "methacryl", whereas "(meth)acrylo" is used to indicate "acrylo" and/or "methacrylo".

<<Functional Group of Binder>>

The polymer used as the binder is required to include at least one functional group selected from the group consisting of a carboxy group, a hydroxyl group, an amino group, an epoxy group, an oxazoline group, a sulfo group, a nitrile group, and an amide group (hereinafter, these functional groups are also referred to collectively as "prescribed functional groups") from a viewpoint of closely adhering a functional layer and a separator substrate strongly and enhancing rate characteristics of a secondary battery. Of these prescribed functional groups, a carboxy group, a hydroxyl group, an amino group, an epoxy group, a nitrile group, and an amide group are preferable from a viewpoint of closely adhering a functional layer and a separator substrate more strongly and further enhancing rate characteristics of a secondary battery. One of these types of functional groups may be used individually, or two or more of these types of functional groups may be used in combination in a freely selected ratio.

Note that in the case of a polymer including two or more types of functional groups, the polymer may be, but is not specifically limited to, a polymer including a carboxy group and a hydroxyl group; a polymer including a carboxy group and an amide group; a polymer including a carboxy group, a nitrile group, and an amino group; or a polymer including a carboxy group, an epoxy group, a hydroxyl group, and a nitrile group, for example.

No specific limitations are placed on the method by which a prescribed functional group is introduced into the polymer. A polymer that includes a prescribed functional group-containing monomer unit may be obtained by producing the polymer using a monomer that includes any of the prescribed functional groups set forth above (prescribed functional group-containing monomer), or a polymer that includes any of the prescribed functional groups set forth above at an end thereof may be obtained through end modification of any polymer, but the former of these methods is preferable. In other words, the polymer used as the binder preferably includes at least any one of a carboxy group-containing monomer unit, a hydroxyl group-containing monomer unit, an amino group-containing monomer unit, an epoxy group-containing monomer unit, an oxazoline group-containing monomer unit, a sulfo group-containing monomer unit, a nitrile group-containing monomer unit, and an amide group-containing monomer unit as a prescribed functional group-containing monomer unit, and more preferably includes at least any one of a carboxy group-containing monomer unit, a hydroxyl group-containing monomer unit, an amino group-containing monomer unit, an epoxy group-containing monomer unit, a nitrile group-containing monomer unit, and an amide group-containing monomer unit as a prescribed functional group-containing monomer unit.

In the case of a polymer that includes two or more types of prescribed functional group-containing monomer units, the polymer may, for example, be a polymer including a carboxy group-containing monomer unit and a hydroxyl group-containing monomer unit; a polymer including a carboxy group-containing monomer unit and an amide group-containing monomer unit; a polymer including a carboxy group-containing monomer unit, a nitrile group-containing monomer unit, and an amino group-containing monomer unit; or a polymer including a carboxy group-containing monomer unit, an epoxy group-containing monomer unit, a hydroxyl group-containing monomer unit, and a nitrile group-containing monomer unit.

Examples of carboxy group-containing monomers that can form a carboxy group-containing monomer unit include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Moreover, an acid anhydride that produces a carboxy group upon hydrolysis can be used as a carboxy group-containing monomer. Of these carboxy group-containing monomers, acrylic acid and methacrylic acid are preferable. Note that one carboxy group-containing monomer may be used individually, or two or more carboxy group-containing monomers may be used in combination in a freely selected ratio.

Examples of hydroxyl group-containing monomers that can form a hydroxyl group-containing monomer unit include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^a-COO-(C_qH_{2q}O)_p-H$ (where p represents an integer of 2 to 9, q represents an integer of 2 to 4, and Ra represents a hydrogen atom or a methyl group); mono(meth) acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; (meth)allyl thioethers of alkylene glycols such as (meth)allyl-2-hydroxyethyl thioether and (meth)allyl-2-hydroxypropyl thioether; and hydroxyl group-containing amides such as N-hydroxymethylacrylamide (N-methylolacrylamide), N-hydroxymethylmethacrylamide, N-hydroxyethylacrylamide, and N-hydroxyethylmethacrylamide. Note that one hydroxyl group-containing monomer may be used individually, or two or more hydroxyl group-containing monomers may be used in combination in a freely selected ratio.

Also note that in the present disclosure, "(meth)allyl" is used to indicate "allyl" and/or "methallyl".

Examples of amino group-containing monomers that can form an amino group-containing monomer unit include dimethylaminoethyl (meth)acrylate, diethylaminoethyl (meth)acrylate, aminoethyl vinyl ether, and dimethylaminoethyl vinyl ether. Note that one amino group-containing monomer may be used individually, or two or more amino group-containing monomers may be used in combination in a freely selected ratio.

Also note that in the present disclosure, "(meth)acrylate" is used to indicate "acrylate" and/or "methacrylate".

Examples of epoxy group-containing monomers that can form an epoxy group-containing monomer unit include monomers that include a carbon-carbon double bond and an epoxy group.

Examples of monomers that include a carbon-carbon double bond and an epoxy group include unsaturated glycidyl ethers such as vinyl glycidyl ether, allyl glycidyl ether, butenyl glycidyl ether, and o-allylphenyl glycidyl ether; monoepoxides of dienes and polyenes such as butadiene monoepoxide, chloroprene monoepoxide, 4,5-epoxy-2-pentene, 3,4-epoxy-1-vinylcyclohexane, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of unsaturated carboxylic acids such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid. Note that one epoxy group-containing monomer may be used individually, or two or more epoxy group-containing monomers may be used in combination in a freely selected ratio.

Examples of oxazoline group-containing monomers that can form an oxazoline group-containing monomer unit include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline. Note that one oxazoline group-containing monomer may be used individually, or two or more oxazoline group-containing monomers may be used in combination in a freely selected ratio.

Examples of sulfo group-containing monomers that can form a sulfo group-containing monomer unit include vinyl sulfonic acid, methyl vinyl sulfonic acid, (meth)allyl sulfonic acid, styrene sulfonic acid, (meth)acrylic acid 2-sulfoethyl, 2-acrylamido-2-methylpropane sulfonic acid, and 3-allyloxy-2-hydroxypropane sulfonic acid. Note that one sulfo group-containing monomer may be used individually, or two or more sulfo group-containing monomers may be used in combination in a freely selected ratio.

Examples of nitrile group-containing monomers that can form a nitrile group-containing monomer unit include α,β-ethylenically unsaturated nitrile monomers. Specifically, any α,β-ethylenically unsaturated compound that includes a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Note that one nitrile group-containing monomer may be used individually, or two or more nitrile group-containing monomers may be used in combination in a freely selected ratio.

Examples of amide group-containing monomers that can form an amide group-containing monomer unit include acrylamide and methacrylamide. Note that one amide group-containing monomer may be used individually, or two or more amide group-containing monomers may be used in combination in a freely selected ratio.

The proportional content of a prescribed functional group-containing monomer unit in the polymer serving as the binder when the amount of all repeating units included in the polymer is taken to be 100 mass % is preferably 0.3 mass % or more, more preferably 0.8 mass % or more, even more preferably 2 mass % or more, and particularly preferably 4 mass % or more, and is preferably 20 mass % or less, more preferably 10 mass % or less, and even more preferably 9 mass % or less. When the proportional content of a prescribed functional group-containing monomer unit in the polymer is within any of the ranges set forth above, a functional layer and a separator substrate can be closely adhered even more strongly, and rate characteristics of a secondary battery can be further enhanced.

Note that the proportional content of each type of monomer unit (repeating unit) in a polymer referred to in the present disclosure can be measured by a nuclear magnetic resonance (NMR) method such as $^1$H-NMR or $^{13}$C-NMR.

<<Production Method of Binder>>

No specific limitations are placed on the method by which the polymer serving as the binder is produced. For example, the polymer serving as the binder may be produced through polymerization of a monomer composition containing the monomers set forth above, carried out in an aqueous solvent. Note that the proportional content of each monomer in the monomer composition can be set in accordance with the desired proportional content of each monomer unit (repeating unit) in the polymer.

The method of polymerization is not specifically limited and can be any of solution polymerization, suspension polymerization, bulk polymerization, and emulsion polymerization, for example. Moreover, ionic polymerization, radical polymerization, living radical polymerization, various types of condensation polymerization, addition polymerization, and so forth can be adopted as the polymerization reaction. Furthermore, a known emulsifier and/or polymerization initiator can be used in the polymerization as necessary.

<<Properties of Binder>>

[Volume-Average Particle Diameter]

The volume-average particle diameter of the binder is preferably 20 nm or more, more preferably 30 nm or more, and even more preferably 50 nm or more, and is preferably 300 nm or less, more preferably 270 nm or less, even more preferably 230 nm or less, and particularly preferably 200 nm or less. When the volume-average particle diameter of the binder is 20 nm or more, a functional layer formed using the slurry composition and a separator substrate can be closely adhered even more strongly. On the other hand, when the volume-average particle diameter of the binder is 300 nm or less, a secondary battery can be caused to display even better rate characteristics through a separator that includes a functional layer formed from the slurry composition.

Note that the binder is preferably water-insoluble. When a given component is referred to as "water-insoluble" in the present disclosure, this means that when 0.5 g of the component is dissolved in 100 g of water at 25° C., insoluble content is 90 mass % or more.

[Glass-Transition Temperature]

The glass-transition temperature of the binder is preferably lower than 25° C., more preferably 0° C. or lower, and even more preferably −20° C. or lower. When the glass-transition temperature of the binder is lower than 25° C., a functional layer formed using the slurry composition and a separator substrate can be closely adhered even more strongly. Although no specific limitations are placed on the lower limit for the glass-transition temperature of the binder, the glass-transition temperature of the binder is normally −100° C. or higher.

The "glass-transition temperature" referred to in the present disclosure can be measured by a method described in the EXAMPLES section of the present specification.

[Carboxy Group Content]

The amount of carboxy groups included in 1 g of the polymer serving as the binder (mmol/g; hereinafter, referred to as the "carboxy group content") is preferably 0.01 mmol/g or more, more preferably 0.1 mmol/g or more, even more preferably 0.2 mmol/g or more, further preferably 0.23 mmol/g or more, even further preferably 0.5 mmol/g or more, and particularly preferably 0.57 mmol/g or more, and is preferably 15 mmol/g or less, more preferably 10 mmol/g or less, even more preferably 9.69 mmol/g or less, further preferably 7 mmol/g or less, even further preferably 5 mmol/g or less, and particularly preferably 4.86 mmol/g or less. When the carboxy group content of the polymer serving as the binder is 0.01 mmol/g or more, the binder and the melamine compound can be caused to sufficiently interact, and a functional layer and a separator substrate can be closely adhered even more strongly. On the other hand, when the carboxy group content of the polymer serving as the binder is 15 mmol/g or less, reduction of stability of the slurry composition can be prevented, and cycle characteristics of a secondary battery can be improved.

Note that the "carboxy group content" referred to in the present disclosure can be calculated from a charged amount (for example, the amount of a carboxy group-containing monomer that is used in production of the polymer serving as the binder) or can be calculated by measuring the acid content of the binder by titration.

[Nitrile Group Content]

The amount of nitrile groups included in 1 g of the polymer serving as the binder (mmol/g; hereinafter, referred to as the "nitrile group content") is preferably 1 mmol/g or more, more preferably 2 mmol/g or more, and even more preferably 2.57 mmol/g or more, and is preferably 40 mmol/g or less, more preferably 35 mmol/g or less, even more preferably 30 mmol/g or less, further preferably 21.6 mmol/g or less, even further preferably 15 mmol/g or less, particularly preferably 11.3 mmol/g or less, and most preferably 5 mmol/g or less. When the nitrile group content of the polymer serving as the binder is 1 mmol/g or more, the binder and the melamine compound can be caused to sufficiently interact, and a functional layer and a separator substrate can be closely adhered even more strongly. On the other hand, when the nitrile group content of the polymer serving as the binder is 40 mmol/g or less, aggregation of the binder in the slurry composition can be prevented, and adequate rate characteristics of a secondary battery can be ensured.

Note that the "nitrile group content" referred to in the present disclosure can be calculated from a charged amount (for example, the amount of a nitrile group-containing monomer used in production of the polymer serving as the binder) or can be calculated through measurement of the nitrogen content in the binder by the modified Dumas method.

<Melamine Compound>

The melamine compound is a component that, through addition thereof to the slurry composition containing the binder, can improve binding capacity of the binder.

Examples of the "melamine compound" referred to in the present disclosure include melamine, derivatives of melamine, and salts thereof.

The melamine or derivative of melamine may be a compound represented by the following formula (I), for example.

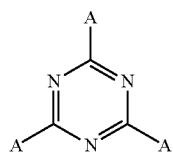

(I)

In formula (I), each A independently represents a hydroxyl group or —NR$^1$R$^2$. (R$^1$ and R$^2$ represent, independently of each another, a hydrogen atom, a hydrocarbon group, or a hydroxyl group-containing hydrocarbon group. In a case in which more than one R$^1$ is present in formula (I), each R$^1$ may be the same or different, and in a case in which more than one R$^2$ is present in formula (I), each R$^2$ may be the same or different.)

Moreover, in the hydrocarbon group and the hydroxyl group-containing hydrocarbon group of 10 and R$^2$, one or more oxygen atoms (—O—) may be present between carbon atoms (however, in a case in which two or more oxygen atoms are present, these oxygen atoms are not adjacent). The number of carbon atoms in the hydrocarbon group and the hydroxyl group-containing hydrocarbon group of 10 and R$^2$ is preferably not less than 1 and not more than 5, but is not specifically limited thereto.

Moreover, examples of salts of melamine and derivatives of melamine include sulfates, cyanurates, and the like, but are not specifically limited thereto.

One melamine compound may be used individually, or two or more melamine compounds may be used in combination in a freely selected ratio. Of these melamine compounds, melamine, ammeline, ammelide, and salts thereof with cyanuric acid are preferable from a viewpoint of closely adhering a functional layer and a separator substrate even more strongly and further enhancing rate characteristics of a secondary battery, with melamine, ammeline, and a salt of melamine with cyanuric acid (melamine cyanurate) being more preferable. Moreover, melamine cyanurate is even more preferable from a viewpoint of closely adhering a functional layer and a separator substrate even more strongly and enhancing cycle characteristics of a secondary battery.

<<Volume-Average Particle Diameter of Melamine Compound>>

The volume-average particle diameter of the melamine compound is required to be not less than 20 nm and not more than 300 nm, is preferably 30 nm or more, more preferably 40 nm or more, and even more preferably 50 nm or more, and is preferably 250 nm or less, more preferably 200 nm or less, and even more preferably 190 nm or less. When the volume-average particle diameter of the melamine compound is less than 20 nm, a functional layer formed using the slurry composition and a separator substrate cannot be closely adhered strongly. On the other hand, when the volume-average particle diameter of the melamine compound is more than 300 nm, a functional layer formed using the slurry composition and a separator substrate cannot be closely adhered strongly, and a secondary battery cannot be caused to display excellent rate characteristics and cycle characteristics through a separator that includes the functional layer.

Note that the volume-average particle diameter of the melamine compound can be adjusted through the method and/or conditions of pulverization/disintegration after melamine compound synthesis, for example. The method of pulverization/disintegration of the melamine compound is not specifically limited and may be performed using a wet/dry-type media stirring mill, a planetary media stirring mill, a wet jet mill, an ultrasonic homogenizer, or the like.

<<Coupling Treatment>>

The melamine compound may be subjected to treatment using a coupling agent (coupling treatment). By using a melamine compound that has undergone coupling treatment, a functional layer and a separator substrate can be closely adhered more strongly while also causing a secondary battery to display even better rate characteristics.

The coupling agent used in the coupling treatment may be a silane coupling agent, a titanium coupling agent, an aluminum coupling agent, or the like. The coupling agent is preferably a coupling agent that includes a functional group (cross-linkable functional group) in the molecular structure thereof that can undergo a cross-linking reaction with a molecular chain of a resin (binder). Specific examples of cross-linkable functional groups include a hydroxyl group, a carboxy group, a carbonyl group, an amino group, a mercapto group, a halogen group, a vinyl group, a methacryloyl group, an acryloyl group, a siloxyl group, a peroxide group, and an epoxy group. The coupling agent may include just one type of cross-linkable functional group or may include two or more types of cross-linkable functional groups. Of these cross-linkable functional groups, a carboxy group, a carbonyl group, and an epoxy group are preferable, and an epoxy group is more preferable.

Examples of silane coupling agents include vinyl group-containing alkoxysilanes such as vinyltriethoxysilane and vinyltris(β-methoxyethoxy)silane; methacryloyl group or acryloyl group-containing alkoxysilanes such as γ-acryloxypropyltrimethoxysilane and γ-methacryloxypropyltrimethoxysilane; epoxy group-containing alkoxysilanes such as γ-glycidoxypropyltrimethoxysilane, β-(3,4-epoxycyclohexyl)ethyltrimethoxysilane, and γ-glycidoxypropylmethyldiethoxysilane; amino group-containing alkoxysilanes such as γ-aminopropyltriethoxysilane, N-β-(aminoethyl)-γ-aminopropyltrimethoxysilane, and N-β-(aminoethyl)-γ-aminopropylmethyldimethoxysilane; mercapto group-containing alkoxysilanes such as γ-mercaptopropyltrimethoxysilane; halogen group-containing alkoxysilanes such as γ-chloropropyltrimethoxysilane; vinyl group and halogen group-containing silanes such as vinyltrichlorosilane; and methyltriacetoxysilane.

Examples of titanium coupling agents include isopropyl triisostearoyl titanate, isopropyl tridodecylbenzenesulfonyl titanate, isopropyl tris(dioctylpyrophosphate) titanate, tetraisopropyl bis(dioctylphosphite) titanate, tetraoctyl bis(ditridecylphosphite) titanate, tetra(2,2-diallyloxymethyl-1-butyl) bis(ditridecyl)phosphite titanate, bis(dioctylpyrophosphate)oxyacetate titanate, bis(dioctylpyrophosphate) ethylene titanate, isopropyl trioctanoyl titanate, isopropyl dimethacryl isostearoyl titanate, isopropyl isostearoyl diacryl titanate, isopropyl tri(dioctylphosphate) titanate, isopropyl tri(N-amidoethylaminoethyl) titanate, dicumylphenyloxyacetate titanate, and diisostearoyl ethylene titanate.

Examples of aluminum coupling agents include acetoalkoxyaluminum diisopropylate.

One of these coupling agents may be used individually, or two or more of these coupling agents may be used in combination in a freely selected ratio. Of these coupling agents, γ-glycidoxypropyltrimethoxysilane is preferable.

No specific limitations are placed on the method by which coupling treatment of the melamine compound is performed. For example, a melamine compound that has undergone coupling treatment can be obtained by stirring a liquid containing a melamine compound and a coupling agent that are dissolved or dispersed in any solvent.

<<Quantitative Ratio of Binder and Melamine Compound>>

The proportion constituted by the melamine compound among the total of the binder and the melamine compound in the slurry composition is required to be not less than 0.5 mass % and not more than 85 mass %, is preferably 1 mass % or more, more preferably 10 mass % or more, even more preferably 15 mass % or more, and particularly preferably 20 mass % or more, and is preferably 80 mass % or less, more preferably 70 mass % or less, and even more preferably 60 mass % or less. When the proportion constituted by the melamine compound among the total of the binder and the melamine compound in the slurry composition is less than 0.5 mass %, a functional layer and a separator substrate cannot be closely adhered strongly, and rate characteristics and cycle characteristics of a secondary battery deteriorate. In addition, permeability of a separator including a functional layer is lost. On the other hand, when the proportion constituted by the melamine compound among the total of the binder and the melamine compound in the slurry composition is more than 85 mass %, a functional layer and a separator substrate cannot be closely adhered strongly.

<Solvent>

Any solvent in which the binder and the melamine compound set forth above can be dissolved or dispersed can be used without any specific limitations as the solvent contained in the slurry composition, and either of water or an organic solvent can be used. Examples of organic solvents that can be used include acetonitrile, N-methyl-2-pyrrolidone, tetrahydrofuran, acetone, acetylpyridine, cyclopentanone, dimethylformamide, dimethyl sulfoxide, methylformamide, methyl ethyl ketone, furfural, ethylenediamine, dimethylbenzene (xylene), methylbenzene (toluene), cyclopentyl methyl ether, and isopropyl alcohol.

Note that one of these solvents may be used individually, or a plurality of these solvents may be used as a mixture in a freely selected mixing ratio.

<Other Components>

In addition to the binder, the melamine compound, and the solvent set forth above, the presently disclosed slurry composition may optionally contain known additives that can be added to functional layers such as other polymers differing from the binder in terms of chemical composition and properties, conductive materials, wetting agents, viscosity modifiers, and additives for electrolyte solution.

The presently disclosed slurry composition can further contain non-conductive particles as another component in order to improve various characteristics such as heat resistance and strength of an obtained functional layer. Any known non-conductive particles that are used in secondary batteries can be used as the non-conductive particles without any specific limitations.

Specifically, although both inorganic fine particles and organic fine particles can be used as the non-conductive particles, inorganic fine particles are normally used. The material of the non-conductive particles is preferably an electrochemically stable material that is present stably in the environment of use of a secondary battery. Examples of non-conductive particles that are preferable from such viewpoints include particles of oxides such as aluminum oxide (alumina), hydrous aluminum oxide (boehmite), silicon oxide, magnesium oxide (magnesia), calcium oxide, titanium oxide (titania), $BaTiO_3$, ZrO, and alumina-silica complex oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, and/or the like as necessary.

One of these types of non-conductive particles may be used individually, or two or more of these types of non-conductive particles may be used in combination. The glass-transition temperature of organic fine particles is not specifically limited but is preferably 25° C. or higher.

The volume-average particle diameter of the non-conductive particles is preferably 20 nm or more, and is preferably 400 nm or less. When the volume-average particle diameter of the non-conductive particles is 20 nm or more, a functional layer formed using the slurry composition and a separator substrate can be closely adhered sufficiently strongly. On the other hand, when the volume-average particle diameter of the non-conductive particles is 400 nm or less, a secondary battery can be caused to display sufficiently good rate characteristics through a separator that includes a functional layer formed from the slurry composition.

In a case in which the presently disclosed slurry composition contains non-conductive particles, the amount of the non-conductive particles in the slurry composition is preferably not less than 100 parts by mass and not more than 500 parts by mass per 100 parts by mass, in total, of the binder and the melamine compound from a viewpoint of achieving the expected improvement of characteristics of a functional layer through the non-conductive particles while also closely adhering the functional layer and a separator substrate sufficiently strongly.

Moreover, the presently disclosed slurry composition may contain a foaming agent such as sodium hydrogen carbonate and a flame retardant such as a phosphorus compound or a silicone compound from a viewpoint of improving secondary battery safety. One of these other components may be used individually, or two or more of these other components may be used in combination.

Note that the content of the foaming agent and the content of the flame retardant can each be set as 30 parts by mass or less or as 15 parts by mass or less per 100 parts by mass of the binder, for example.

<Production Method of Slurry Composition>

The slurry composition can be produced without any specific limitations by mixing the above-described components. For example, the slurry composition can be produced by producing a binder composition containing the binder, the melamine compound, and the solvent, and subsequently adding other components (non-conductive particles, etc.) and additional solvent that are used as necessary to the obtained binder composition and performing mixing thereof.

(Separator for Non-Aqueous Secondary Battery)

The presently disclosed separator includes a separator substrate and a functional layer that is formed of a dried product of the presently disclosed slurry composition set forth above. In the presently disclosed separator, the functional layer can be closely adhered strongly to the separator substrate as a result of the functional layer being formed from the presently disclosed slurry composition. Moreover, a secondary battery can be caused to display excellent battery characteristics (rate characteristics, etc.) through the presently disclosed separator.

<Separator Substrate>

The separator substrate is not specifically limited and may be a known separator substrate such as an organic separator substrate. The organic separator substrate is a porous member that is made from an organic material. The organic separator substrate is, for example, preferably a microporous membrane or a non-woven fabric containing a polyolefin resin, such as polyethylene or polypropylene, or an aromatic polyamide resin from a viewpoint of enhancing cycle characteristics of a secondary battery while also further improving rate characteristics of the secondary battery, and is more preferably a microporous membrane or a non-woven fabric made from polyethylene due to the excellent strength thereof.

<Functional Layer>

The functional layer is formed of a dried product of the presently disclosed slurry composition as previously described. In other words, the functional layer included in the presently disclosed separator normally contains at least a binder and a melamine compound, and optionally contains other components such as non-conductive particles. Note that since components contained in the functional layer are components that were contained in the presently disclosed slurry composition set forth above, the preferred ratio of these components is the same as the preferred ratio of the components in the presently disclosed slurry composition. Also note that in a case in which a polymer such as the binder is a polymer that includes a cross-linkable functional group (for example, an epoxy group or an oxazoline group), the polymer may be cross-linked during drying of the slurry composition or during heat treatment or the like that is optionally implemented after drying (i.e., the functional layer may contain a cross-linked product of the previously described binder).

Although the functional layer that is a dried product of the slurry composition may contain a solvent such as water originating from the slurry composition, the solvent content in the functional layer is preferably 3 mass % or less, more preferably 1 mass % or less, even more preferably 0.1 mass % or less, and particularly preferably 0 mass % or less (i.e., below the limit of detection) from a viewpoint of ensuring battery characteristics (rate characteristics, etc.) of a secondary battery.

It is preferable that the dried product of the slurry composition forms the functional layer at the surface of the separator substrate and is also, continuously with the functional layer, present in an inner part of the separator substrate. As a result of a portion of the dried product that forms the functional layer encroaching into an inner part of the separator substrate in this manner, the functional layer and the separator substrate can be closely adhered even more strongly.

Note that in order that a portion of the dried product is present in an inner part of the separator substrate, the inner part of the separator substrate may be impregnated with the slurry composition when the slurry composition is applied onto the surface of the separator substrate, and drying may be performed in a state in which the slurry composition is present in the inner part of the separator substrate, for example. Impregnation of an inner part the separator substrate with the slurry composition can be achieved by reducing the volume-average particle diameter of components (binder, melamine compound, etc.) in the slurry composition, lowering the viscosity of the slurry composition, and using a separator having a large porosity and pore diameter.

<Production Method of Separator>

Examples of methods by which the functional layer may be formed on the separator substrate to produce the presently disclosed separator include:

(1) a method in which the presently disclosed slurry composition is supplied to the surface of the separator substrate and is then dried; and (2) a method in which the presently disclosed slurry composition is supplied onto a releasable substrate and is dried to produce a functional layer that is then transferred onto the surface of the separator substrate.

Of these methods, method (1) is particularly preferable since it allows simple control of the thickness of the functional layer. In more detail, method (1) includes a step of supplying the slurry composition onto the separator substrate (supply step) and a step of drying the slurry composition that has been applied onto the separator substrate to form a functional layer (drying step).

<<Supply Step>>

The method by which the slurry composition is supplied onto the separator substrate in the supply step may, for example, be a method in which the slurry composition is applied onto the surface of the separator substrate or a method in which the separator substrate is immersed in the slurry composition. Specific examples of these methods include, but are not specifically limited to, doctor blading, reverse roll coating, direct roll coating, gravure coating, extrusion coating, brush coating, dip coating, spray coating, and vacuum impregnation.

Note that dip coating, spray coating, vacuum impregnation, and gravure coating are preferable for impregnating an inner part of the separator substrate with the slurry composition.

<<Drying Step>>

The method by which the slurry composition on the separator substrate is dried in the drying step is not specifically limited and may be a commonly known method. Examples of drying methods that may be used include drying by warm, hot, or low-humidity air, drying in a vacuum, and drying through irradiation with infrared light, electron beams, or the like. The drying temperature is preferably lower than 200° C., and more preferably lower than 150° C. in order to avoid thermal decomposition and sublimation of the used melamine compound.

Note that the thickness of the functional layer produced on the separator substrate as set forth above is preferably not less than 0.1 μm and not more than 10 μm from a viewpoint of ensuring strength of the functional layer while also further improving rate characteristics of a secondary battery.

(Non-Aqueous Secondary Battery)

The presently disclosed secondary battery includes the presently disclosed separator set forth above. More specifically, the presently disclosed non-aqueous secondary battery includes a positive electrode, a negative electrode, a separator, and an electrolyte solution, and has the presently disclosed separator for a non-aqueous secondary battery set forth above as the separator. The presently disclosed secondary battery can display excellent battery characteristics (for example, rate characteristics).

<Positive Electrode and Negative Electrode>

Known positive electrodes and negative electrodes can be used as the positive electrode and the negative electrode used in the presently disclosed secondary battery without any specific limitations.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents in the case of a lithium ion secondary battery, for example, include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Non-Aqueous Secondary Battery>

The presently disclosed secondary battery set forth above can be produced by, for example, stacking the positive electrode and the negative electrode with the separator in-between, performing rolling, folding, or the like of the resultant laminate as necessary to place the laminate in a battery container, injecting the electrolyte solution into the battery container, and sealing the battery container. Note that at least one member among the positive electrode, the negative electrode, and the separator is a battery member that includes the presently disclosed functional layer. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may, for example, be a coin type, a button type, a sheet type, a cylinder type, a prismatic type, or a flat type.

EXAMPLES

The following provides a more specific description of the present disclosure based on examples. However, the present disclosure is not limited to the following examples. In the following description, "%" and "parts" used in expressing quantities are by mass, unless otherwise specified.

In the examples and comparative examples, the following methods were used to measure and evaluate the volume-average particle diameters of a binder, a melamine compound, and non-conductive particles, the glass-transition temperature of a binder, the close adherence of a functional layer and a separator substrate, the permeability of a separator, the presence of a dried product of a slurry composition in an inner part of a separator substrate, and the rate characteristics and cycle characteristics of a secondary battery.

<Volume-Average Particle Diameter>

The volume-average particle diameters of a binder, a melamine compound, and non-conductive particles were measured as follows by laser diffraction. First, a water dispersion containing the binder, the melamine compound, or the non-conductive particles (i.e., the measurement target) in a solid content concentration of 0.1 mass % was produced so as to prepare a measurement sample. A dynamic light scattering particle diameter distribution analyzer (produced by Horiba, Ltd.; product name: SZ-100) was used to measure a particle diameter distribution (by volume), and the particle diameter at which the cumulative undersize calculated from a small diameter end of the distribution reached 50% was taken to be the volume-average particle diameter.

<Glass-Transition Temperature>

First, a water dispersion containing a binder that had been produced was dried at a temperature of 25° C. for 48 hours, and the resultant powder was taken to be a measurement sample.

Next, 10 mg of the measurement sample was weighed into an aluminum pan and was measured by a differential scanning calorimeter (produced by SIT NanoTechnology Inc.; product name: EXSTAR DSC6220) under conditions prescribed by JIS Z8703 with a measurement temperature range of −100° C. to 200° C. and a heating rate of 20° C./min to obtain a differential scanning calorimetry (DSC) curve. An empty aluminum pan was used as a reference. In the heating process, the temperature at which a derivative signal (DDSC) displayed a peak was determined as the glass-transition temperature (° C.).

<Close Adherence>

A produced separator including a functional layer was cut out as a rectangle of 100 mm in length and 10 mm in width to obtain a test specimen, was placed with the surface at which the functional layer was present facing downward, and the surface of the functional layer of the test specimen was affixed to a test stage (base plate made from SUS) via cellophane tape (tape prescribed by JIS Z1522). Thereafter, the stress (N/m) when the separator was peeled off by pulling one end of the separator in a perpendicular direction at a pulling speed of 50 mm/min was measured. (Note that the cellophane tape was secured to the test stage.) A total of three measurements were performed in this manner to determine an average value that was taken to be the peel strength and was evaluated by the following standard. A larger value for the peel strength indicates that the functional layer and the separator substrate are closely adhered more strongly.

A: Peel strength of 40.0 N/m or more
B: Peel strength of not less than 30.0 N/m and less than 40.0 N/m
C: Peel strength of not less than 20.0 N/m and less than 30.0 N/m
D: Peel strength of less than 20.0 N/m <Permeability>

A digital Koen Type Air-Permeability and Smoothness Tester (produced by Asahi Seiko Co., Ltd.; product name: EYO-5-1M-R) was used to measure the Gurley value (s/100 cc-air) of a separator substrate used in production of a separator and a separator that had undergone functional layer formation. Specifically, the Gurley value G0 of the "separator substrate" and the Gurley value G1 of the "separator" that had undergone functional layer formation were used to calculate the increase of the Gurley value $\Delta G$ (=G1−G0), which was then evaluated by the following standard. A smaller increase of the Gurley value $\Delta G$ indicates that permeability of the separator is reduced less through functional layer formation and that the separator has higher ion conductivity.

A: $\Delta G$ of less than 10 s/100 cc-air
B: $\Delta G$ of not less than 10 s/100 cc-air and less than 15 s/100 cc-air
C: $\Delta G$ of not less than 15 s/100 cc-air and less than 20 s/100 cc-air
D: $\Delta G$ of not less than 20 s/100 cc-air and less than 30 s/100 cc-air
E: $\Delta G$ of 30 s/100 cc-air or more <Presence of Dried Product of Slurry Composition in Inner Part of Separator Substrate>

An obtained separator was sectioned in a thickness direction using a cross-sectional sample preparation tool (produced by JEOL Ltd.; product name: CROSS SECTION POLISHER® (CROSS SECTION POLISHER is a registered trademark in Japan, other countries, or both)). The sectioned surface was observed under a field emission scanning electron microscope (produced by Hitachi High-Technologies Corporation; product name: 54700) in order to confirm whether a dried product of a slurry composition (specifically, a binder and/or a melamine compound) was present in an inner part of the separator substrate.

Note that the presence of a dried product of a slurry composition in an inner part of a separator substrate can be confirmed by glow discharge optical emission spectroscopy, EPMA analysis through Os staining, or the like.

<Rate Characteristics>

A produced lithium ion secondary battery was left at rest at a temperature of 25° C. for 5 hours after injection of electrolyte solution. Next, the lithium ion secondary battery was charged to a cell voltage of 3.65 V by a 0.2 C constant-current method at a temperature of 25° C. and was then subjected to 12 hours of aging at a temperature of 60° C. The lithium ion secondary battery was subsequently discharged to a cell voltage of 3.00 V by a 0.2 C constant-current method at a temperature of 25° C. Thereafter, CC-CV charging of the lithium ion secondary battery was performed with a 0.2 C constant current (upper limit cell voltage: 4.35 V) and CC discharging of the lithium ion secondary battery was performed to a cell voltage of 3.00 V with a 0.2 C constant current. This charging and discharging at 0.2 C was repeated three times.

Next, the lithium ion secondary battery was subjected to 0.2 C constant-current charging and discharging between cell voltages of 4.35 V and 3.00 V in an environment having a temperature of 25° C., and the discharge capacity at this time was defined as C0. Thereafter, the lithium ion secondary battery was CC-CV charged with a 0.2 C constant current in the same manner and was then discharged to 2.5 V with a 0.5 C constant current in an environment having a temperature of −10° C., and the discharge capacity at this time was defined as C1. A capacity maintenance rate expressed by $\Delta C=(C1/C0)\times100(\%)$ was determined as a rate characteristic and was evaluated by the following standard. A larger value for the capacity maintenance rate $\Delta C$ indicates higher discharge capacity at high current in low-temperature environments and lower internal resistance.

A: Capacity maintenance rate $\Delta C$ of 70% or more
B: Capacity maintenance rate $\Delta C$ of not less than 65% and less than 70%
C: Capacity maintenance rate $\Delta C$ of not less than 60% and less than 65%
D: Capacity maintenance rate $\Delta C$ of less than 60%

<Cycle Characteristics>

A produced lithium ion secondary battery was left at rest at a temperature of 25° C. for 24 hours after injection of electrolyte solution. Thereafter, the lithium ion secondary battery was subjected to a charge/discharge operation of charging to 4.35 V by a constant-voltage constant-current (CC-CV) method at a charge rate of 1 C (cut-off condition: 0.02 C) and discharging to 3.0 V by a constant-current (CC) method at a discharge rate of 1 C at a temperature of 25° C., and the initial capacity C2 was measured.

The lithium ion secondary battery was also repeatedly subjected to the same charge/discharge operation in a 45° C. environment, and the capacity C3 after 300 cycles was measured. The capacity maintenance rate $\Delta C'=(C3/C2)\times100$ (%) was calculated and was evaluated by the following standard. A higher value for the capacity maintenance rate $\Delta C'$ indicates a smaller decrease of discharge capacity and better cycle characteristics.

A: Capacity maintenance rate $\Delta C'$ of 85% or more
B: Capacity maintenance rate $\Delta C'$ of not less than 80% and less than 85%
C: Capacity maintenance rate $\Delta C'$ of not less than 75% and less than 80%
D: Capacity maintenance rate $\Delta C'$ of less than 75%

Example 1

<Production of Binder (Polymer A)>

A reactor including a stirrer was charged with 70 parts of deionized water, 0.15 parts of sodium lauryl sulfate (produced by Kao Corporation; product name: EMAL 2 F) as an emulsifier, and 0.5 parts of ammonium persulfate, the gas phase was purged with nitrogen gas, and heating was performed to 60° C.

Meanwhile, a monomer composition was obtained in a separate vessel by mixing 50 parts of deionized water, 0.5 parts of sodium dodecylbenzenesulfonate as an emulsifier, 94 parts of n-butyl acrylate as a (meth)acrylic acid alkyl ester monomer, 2 parts of acrylonitrile as a nitrile group-containing monomer, 2 parts of methacrylic acid as a carboxy group-containing monomer, 1 part of N-hydroxymethylacrylamide as a hydroxyl group-containing monomer, and 1 part of allyl glycidyl ether as an epoxy group-containing monomer. The monomer composition was continuously added into the reactor over 4 hours to carry out polymerization. The reaction was carried out at 60° C. during the addition. Once this addition was completed, a further 3 hours of stirring was performed at 70° C. to complete the reaction and yield a water dispersion containing a polymer A (water-insoluble) as a binder.

The volume-average particle diameter and glass-transition temperature of the obtained binder were measured. The results are shown in Table 1. Moreover, the carboxy group content and nitrile group content of the obtained binder were respectively calculated from the charged amount of methacrylic acid as a carboxy group-containing monomer and the charged amount of acrylonitrile as a nitrile group-containing monomer. The results are shown in Table 1.

<Production of Slurry Composition for Non-Aqueous Secondary Battery Functional Layer>

A slurry composition was produced by stirring 50 parts (in terms of solid content) of the water dispersion of the polymer A, 50 parts of melamine cyanurate A (volume-average particle diameter: 190 nm) as a melamine compound, 5 parts of a wetting agent (produced by Kao Corporation; product name: EMULGEN® 120 (EMULGEN is a registered trademark in Japan, other countries, or both)), and 600 parts of deionized water for 30 minutes using a Three-One Motor.

<Production of Separator Including Functional Layer>

The slurry composition obtained as described above was applied onto a separator substrate made from polypropylene (produced by Celgard, LLC.; product name: Celgard® 2500 (Celgard is a registered trademark in Japan, other countries, or both); thickness: 25 μm; microporous membrane) and was dried at a temperature of 50° C. for 3 minutes to obtain a separator including a functional layer (functional layer thickness: 2 μm) at one side of the separator substrate. This separator was used to evaluate close adherence of the functional layer and the separator substrate, permeability of the separator, and presence of a dried product of the slurry composition in an inner part of the separator substrate. The results are shown in Table 1.

<Production of Negative Electrode>

A 5 MPa pressure vessel equipped with a stirrer was charged with 33.5 parts of 1,3-butadiene, 3.5 parts of itaconic acid, 62 parts of styrene, 1 part of 2-hydroxyethyl acrylate, 0.4 parts of sodium dodecylbenzenesulfonate as an emulsifier, 150 parts of deionized water, and 0.5 parts of potassium persulfate as a polymerization initiator. These materials were sufficiently stirred and were then heated to 50° C. to initiate polymerization. The polymerization reaction was quenched by cooling at the point at which the polymerization conversion rate reached 96% to yield a mixture containing a particulate binder (styrene-butadiene copolymer).

The mixture was adjusted to pH 8 through addition of 5% sodium hydroxide aqueous solution and was then subjected to thermal-vacuum distillation to remove unreacted monomer. Thereafter, the mixture was cooled to 30° C. or lower to obtain a water dispersion containing a binder for a negative electrode mixed material layer.

Next, a mixture containing 100 parts of artificial graphite (volume-average particle diameter: 15.6 μm) as a negative electrode active material and 1 part in terms of solid content of a 2% aqueous solution of carboxymethyl cellulose sodium salt (produced by Nippon Paper Industries Co., Ltd.; product name: MAC350HC) as a thickener was adjusted to a solid content concentration of 68% with deionized water and was then mixed at 25° C. for 60 minutes. The solid content concentration was then adjusted to 62% with deionized water, and then a further 15 minutes of mixing was performed at 25° C. to obtain a mixture. Deionized water and 1.5 parts in terms of solid content of the water dispersion containing the binder for a negative electrode mixed material layer described above were added to the obtained mixture, the final solid content concentration was adjusted to 52%, and a further 10 minutes of mixing was performed. The resultant mixture was subjected to a defoaming process under reduced pressure to yield a slurry composition for a negative electrode having good fluidity.

The slurry composition for a negative electrode obtained as described above was applied onto one side of copper foil (thickness: 20 μm) serving as a current collector using a comma coater such as to have a thickness after drying of approximately 150 μm. The slurry composition was dried by conveying the coated copper foil inside a 60° C. oven for 2 minutes at a speed of 0.5 m/min. Thereafter, 2 minutes of heat treatment was performed at 120° C. to obtain a pre-pressing negative electrode web. The pre-pressing negative electrode web was rolled by roll pressing to obtain a negative electrode including a negative electrode mixed material layer (thickness: 100 μm) at one side of the current collector.

<Production of Positive Electrode>

A mixture adjusted to a total solid content concentration of 70% was obtained by mixing 100 parts of LiCoO$_2$ (volume-average particle diameter: 12 μm) as a positive electrode active material, 2 parts of acetylene black (produced by Denka Company Limited; product name: HS-100) as a conductive material, and 2 parts in terms of solid content of polyvinylidene fluoride (produced by Kureha Corporation; product name: #7208) as a binder for a positive electrode mixed material layer with N-methylpyrrolidone as a solvent. The obtained mixture was mixed using a planetary mixer to obtain a slurry composition for a positive electrode.

The slurry composition for a positive electrode obtained as described above was applied onto one side of aluminum foil (thickness: 20 μm) serving as a current collector using a comma coater such as to have a thickness after drying of approximately 150 μm. The slurry composition was dried by conveying the aluminum foil inside a 60° C. oven for 2 minutes at a speed of 0.5 m/min. Thereafter, 2 minutes of heat treatment was performed at 120° C. to obtain a pre-pressing positive electrode web. The pre-pressing positive electrode web was rolled by roll pressing to obtain a positive electrode including a positive electrode mixed material layer (thickness: 95 μm) at one side of the current collector.

<Production of Secondary Battery>

An aluminum packing case was prepared as a battery case. The produced positive electrode was cut out as a 4.6 cm×4.6 cm square to obtain a square positive electrode. The produced separator was cut out as a 5.2 cm×5.2 cm square to obtain a square separator. The produced negative electrode was cut out as a 5 cm×5 cm square to obtain a square negative electrode. The square positive electrode was arranged inside the aluminum packing case such that a surface at the current collector side of the positive electrode was in contact with the aluminum packing case. The square separator was arranged on a surface at the positive electrode mixed material layer side of the square positive electrode such that the functional layer of the separator was in contact with the square positive electrode. The square negative electrode was arranged on the separator such that a surface at the negative electrode mixed material layer side of the negative electrode faced toward the separator. Next, electrolyte solution was injected such that no air remained. Note that the electrolyte solution was a solution containing $LiPF_6$ of 1 M in concentration as a supporting electrolyte in a mixed solvent of ethylene carbonate (EC), ethyl methyl carbonate (EMC), and vinylene carbonate (volume mixing ratio: EC/EMC/VC=68.5/30/1.5). The aluminum packing case was then closed by heat sealing at 150° C. to produce a lithium ion secondary battery.

The rate characteristics and cycle characteristics of this lithium ion secondary battery were evaluated. The results are shown in Table 1.

Example 2

A binder, a slurry composition for a non-aqueous secondary battery functional layer, a separator including a functional layer, a negative electrode, a positive electrode, and a secondary battery were produced, and various evaluations were performed in the same way as in Example 1 with the exception that 300 parts of alumina (produced by Sumitomo Chemical Co., Ltd.; product name: AKP30; volume-average particle diameter: 300 nm) as non-conductive particles was also used in production of the slurry composition for a non-aqueous secondary battery functional layer. The results are shown in Table 1.

Example 3

A binder, a slurry composition for a non-aqueous secondary battery functional layer, a separator including a functional layer, a negative electrode, a positive electrode, and a secondary battery were produced, and various evaluations were performed in the same way as in Example 1 with the exception that melamine cyanurate B (volume-average particle diameter: 270 nm) was used instead of melamine cyanurate A as a melamine compound in production of the slurry composition for a non-aqueous secondary battery functional layer. The results are shown in Table 1.

Example 4

A slurry composition for a non-aqueous secondary battery functional layer, a separator including a functional layer, a negative electrode, a positive electrode, and a secondary battery were produced, and various evaluations were performed in the same way as in Example 1 with the exception that a polymer B produced as described below was used instead of the polymer A as a binder and melamine cyanurate C (volume-average particle diameter: 50 nm) was used instead of melamine cyanurate A as a melamine compound in production of the slurry composition for a non-aqueous secondary battery functional layer. The results are shown in Table 1.

<Production of Binder (Polymer B)>

A reactor including a stirrer was charged with 300 parts of deionized water, 1.5 parts of sodium lauryl sulfate (produced by Kao Corporation; product name: EMAL 2F) as an emulsifier, 94 parts of n-butyl acrylate as a (meth)acrylic acid alkyl ester monomer, 2 parts of acrylonitrile as a nitrile group-containing monomer, 2 parts of methacrylic acid as a carboxy group-containing monomer, 1 part of N-hydroxymethylacrylamide as a hydroxyl group-containing monomer, and 1 part of allyl glycidyl ether as an epoxy group-containing monomer, the gas phase was purged with nitrogen gas, and heating was performed to 70° C. Thereafter, 0.8 parts of ammonium persulfate was added and was stirred therewith for 2 hours. Next, a further 3 hours of stirring was performed at 80° C. to complete the reaction and yield a water dispersion containing a polymer B (water-insoluble) as a binder.

Example 5

A binder, a slurry composition for a non-aqueous secondary battery functional layer, a negative electrode, a positive electrode, and a secondary battery were produced, and various evaluations were performed in the same way as in Example 4 with the exception that a separator including a functional layer that was produced as described below was used. The results are shown in Table 1.

<Production of Separator Including Functional Layer>

A separator substrate made from polyethylene (thickness: 12 μm; air resistance: 100 s/100 cc-air; microporous membrane) was immersed in the produced slurry composition for 2 minutes, was subsequently removed from the slurry composition, and excess slurry composition on the surface thereof was scraped off. Thereafter, 1 minute of drying was performed in a 50° C. oven to produce a separator including functional layers at both sides (functional layer thickness per one side: 1 μm). This separator was used to evaluate close adherence of the functional layers and the separator substrate, permeability of the separator, and presence of a dried product of the slurry composition in an inner part of the separator substrate. The results are shown in Table 1.

Example 6

A binder, a slurry composition for a non-aqueous secondary battery functional layer, a separator including a functional layer, a negative electrode, a positive electrode, and a secondary battery were produced, and various evaluations were performed in the same way as in Example 5 with the exception that 300 parts of alumina (produced by Nippon Aerosil Co., Ltd.; product name: AEROXIDE® Alu 65 (AEROXIDE is a registered trademark in Japan, other countries, or both); volume-average particle diameter: 25 nm) as non-conductive particles was also used in production of the slurry composition for a non-aqueous secondary battery functional layer. The results are shown in Table 1.

Example 7

A binder, a slurry composition for a non-aqueous secondary battery functional layer, a separator including a functional layer, a negative electrode, a positive electrode, and a secondary battery were produced, and various evaluations were performed in the same way as in Example 1 with the exception that ammeline A (volume-average particle diameter: 190 nm) was used instead of melamine cyanurate A as a melamine compound in production of the slurry composition for a non-aqueous secondary battery functional layer. The results are shown in Table 1.

Example 8

A binder, a slurry composition for a non-aqueous secondary battery functional layer, a separator including a functional layer, a negative electrode, a positive electrode, and a secondary battery were produced, and various evaluations were performed in the same way as in Example 5 with the exception that ammeline B (volume-average particle diameter: 50 nm) was used instead of melamine cyanurate C as a melamine compound in production of the slurry composition for a non-aqueous secondary battery functional layer. The results are shown in Table 1.

Example 9

A binder, a slurry composition for a non-aqueous secondary battery functional layer, a separator including a functional layer, a negative electrode, a positive electrode, and a secondary battery were produced, and various evaluations were performed in the same way as in Example 1 with the exception that melamine A (volume-average particle diameter: 190 nm) was used instead of melamine cyanurate A as a melamine compound in production of the slurry composition for a non-aqueous secondary battery functional layer. The results are shown in Table 2.

Example 10

A binder, a slurry composition for a non-aqueous secondary battery functional layer, a separator including a functional layer, a negative electrode, a positive electrode, and a secondary battery were produced, and various evaluations were performed in the same way as in Example 5 with the exception that melamine B (volume-average particle diameter: 50 nm) was used instead of melamine cyanurate C as a melamine compound in production of the slurry composition for a non-aqueous secondary battery functional layer. The results are shown in Table 2.

Examples 11 and 12

A binder, a slurry composition for a non-aqueous secondary battery functional layer, a separator including a functional layer, a negative electrode, a positive electrode, and a secondary battery were produced, and various evaluations were performed in the same way as in Example 1 with the exception that the amounts of the binder and melamine cyanurate A used in production of the slurry composition for a non-aqueous secondary battery functional layer were changed as shown in Table 2. The results are shown in Table 2.

Example 13

<Production of Binder (Polymer C)>

A reactor including a stirrer was charged with 70 parts of deionized water, 0.15 parts of sodium lauryl sulfate (produced by Kao Corporation; product name: EMAL 2F) as an emulsifier, and 0.5 parts of ammonium persulfate, the gas phase was purged with nitrogen gas, and heating was performed to 60° C.

Meanwhile, a monomer composition was obtained in a separate vessel by mixing 50 parts of deionized water, 0.5 parts of sodium dodecylbenzenesulfonate as an emulsifier, 94 parts of 2-ethylhexyl acrylate as a (meth)acrylic acid alkyl ester monomer, 2 parts of acrylonitrile as a nitrile group-containing monomer, 2 parts of methacrylic acid as a carboxy group-containing monomer, 1 part of N-hydroxymethylacrylamide as a hydroxyl group-containing monomer, and 1 part of allyl glycidyl ether as an epoxy group-containing monomer. The monomer composition was continuously added into the reactor over 4 hours to carry out polymerization. The reaction was carried out at 60° C. during the addition. Once this addition was completed, a further 3 hours of stirring was performed at 70° C. to complete the reaction and yield a water dispersion containing a polymer C (water-insoluble) as a binder.

The volume-average particle diameter and glass-transition temperature of the obtained binder were measured. The results are shown in Table 2. Moreover, the carboxy group content and nitrile group content of the obtained binder were respectively calculated from the charged amount of methacrylic acid as a carboxy group-containing monomer and the charged amount of acrylonitrile as a nitrile group-containing monomer. The results are shown in Table 2.

<Production of Coupling-Treated Melamine Compound (Coupling-Treated Melamine Cyanurate A)>

After adding 100 parts of melamine cyanurate A and 1.5 parts of γ-glycidoxypropyltrimethoxysilane as a coupling agent to 100 parts of hexane, stirring thereof was performed at room temperature for 30 minutes. Once this stirring was completed, hexane was removed by drying to yield coupling-treated melamine cyanurate A.

<Production of Slurry Composition for Non-Aqueous Secondary Battery Functional Layer>

A slurry composition was produced by stirring 50 parts (in terms of solid content) of the water dispersion of the polymer C, 50 parts of coupling-treated melamine cyanurate A (volume-average particle diameter: 190 nm), 5 parts of a wetting agent (produced by Kao Corporation; product name: EMULGEN® 120), and 600 parts of deionized water for 30 minutes using a Three-One Motor.

<Production of Separator Including Functional Layer>

The slurry composition obtained as described above was applied onto a separator substrate made from polypropylene (produced by Japan Vilene Company, Ltd.; product name: FT-300; thickness: 160 µm; non-woven fabric) using a gravure coater and was dried at a temperature of 50° C. for 3 minutes to obtain a separator including a functional layer (functional layer thickness: 3 µm) at one side of the separator substrate. This separator was used to evaluate close adherence of the functional layer and the separator substrate, permeability of the separator, and presence of a dried product of the slurry composition in an inner part of the separator substrate. The results are shown in Table 2.

<Production of Negative Electrode, Positive Electrode, and Secondary Battery>

A negative electrode, a positive electrode, and a secondary battery were produced, and various evaluations were performed in the same way as in Example 1 with the exception that the separator including a functional layer that was produced as described above was used. The results are shown in Table 2.

Example 14

A binder, a slurry composition for a non-aqueous secondary battery functional layer, a separator including a functional layer, a negative electrode, a positive electrode, and a secondary battery were produced, and various evaluations were performed in the same way as in Example 13 with the exception that 300 parts of alumina (produced by Sumitomo Chemical Co., Ltd.; product name: AKP30; volume-average particle diameter: 300 nm) as non-conductive particles was also used in production of the slurry composition for a non-aqueous secondary battery functional layer. The results are shown in Table 2.

Example 15

A binder, a slurry composition for a non-aqueous secondary battery functional layer, a separator including a functional layer, a negative electrode, a positive electrode, and a secondary battery were produced, and various evaluations were performed in the same way as in Example 13 with the exception that melamine cyanurate A was used instead of coupling-treated melamine cyanurate A as a melamine compound and 300 parts of alumina (produced by Sumitomo Chemical Co., Ltd.; product name: AKP30; volume-average particle diameter: 300 nm) as non-conductive particles was also used in production of the slurry composition for a non-aqueous secondary battery functional layer. The results are shown in Table 2.

Example 16

A binder, a slurry composition for a non-aqueous secondary battery functional layer, a separator including a functional layer, a negative electrode, a positive electrode, and a secondary battery were produced, and various evaluations were performed in the same way as in Example 13 with the exception that coupling-treated melamine cyanurate B produced as described below was used instead of coupling-treated melamine cyanurate A as a melamine compound and 300 parts of alumina (produced by Sumitomo Chemical Co., Ltd.; product name: AKP30; volume-average particle diameter: 300 nm) as non-conductive particles was also used in production of the slurry composition for a non-aqueous secondary battery functional layer. The results are shown in Table 2.

<Production of Coupling-Treated Melamine Compound (Coupling-Treated Melamine Cyanurate B)>

After adding 100 parts of melamine cyanurate B and 1.5 parts of γ-glycidoxypropyltrimethoxysilane as a coupling agent to 100 parts of hexane, stirring thereof was performed at room temperature for 30 minutes. Once this stirring was completed, hexane was removed by drying to yield coupling-treated melamine cyanurate B.

Example 17

A binder, a slurry composition for a non-aqueous secondary battery functional layer, a separator including a functional layer, a negative electrode, a positive electrode, and a secondary battery were produced, and various evaluations were performed in the same way as in Example 13 with the exception that coupling-treated melamine cyanurate C produced as described below was used instead of coupling-treated melamine cyanurate A as a melamine compound and 300 parts of alumina (produced by Sumitomo Chemical Co., Ltd.; product name: AKP30; volume-average particle diameter: 300 nm) as non-conductive particles was also used in production of the slurry composition for a non-aqueous secondary battery functional layer. The results are shown in Table 3.

<Production of Coupling-Treated Melamine Compound (Coupling-Treated Melamine Cyanurate C)>

After adding 100 parts of melamine cyanurate C and 1.5 parts of γ-glycidoxypropyltrimethoxysilane as a coupling agent to 100 parts of hexane, stirring thereof was performed at room temperature for 30 minutes. Once this stirring was completed, hexane was removed by drying to yield coupling-treated melamine cyanurate C.

Example 18

A binder (polymer A) was produced in the same way as in Example 1. A slurry composition for a non-aqueous secondary battery functional layer, a separator including a functional layer, a negative electrode, a positive electrode, and a secondary battery were then produced, and various evaluations were performed in the same way as in Example 13 with the exception that the polymer A was used instead of the polymer C as a binder in production of the slurry composition for a non-aqueous secondary battery functional layer. The results are shown in Table 3.

Example 19

A binder (polymer A) was produced in the same way as in Example 1. A slurry composition for a non-aqueous secondary battery functional layer, a separator including a functional layer, a negative electrode, a positive electrode, and a secondary battery were then produced, and various evaluations were performed in the same way as in Example 13 with the exception that the polymer A was used instead of the polymer C as a binder and melamine cyanurate A was used instead of coupling-treated melamine cyanurate A as a melamine compound in production of the slurry composition for a non-aqueous secondary battery functional layer. The results are shown in Table 3.

Example 20

A slurry composition for a non-aqueous secondary battery functional layer, a separator including a functional layer, a negative electrode, a positive electrode, and a secondary battery were produced, and various evaluations were performed in the same way as in Example 13 with the exception that a separator substrate made from cellulose (produced by Daicel Corporation; product name: CELISH KY-100G; thickness: 20 μm; non-woven fabric) was used instead of the separator substrate made from polypropylene in production of the separator including a functional layer. The results are shown in Table 3.

Example 21

A slurry composition for a non-aqueous secondary battery functional layer, a separator including a functional layer, a negative electrode, a positive electrode, and a secondary battery were produced, and various evaluations were performed in the same way as in Example 13 with the exception that a separator substrate made from polyester (produced by Awa Paper & Technological Company, Inc.; product name: PURELY; thickness: 30 μm; non-woven fabric) was used instead of the separator substrate made from polypropylene in production of the separator including a functional layer. The results are shown in Table 3.

Comparative Example 1

A binder, a slurry composition for a non-aqueous secondary battery functional layer, a separator including a functional layer, a negative electrode, a positive electrode, and a secondary battery were produced, and various evaluations were performed in the same way as in Example 1 with the exception that melamine cyanurate A was not used and the amount of the binder (polymer A) was set as 100 parts in production of the slurry composition for a non-aqueous secondary battery functional layer. The results are shown in Table 3.

Comparative Example 2

A binder, a slurry composition for a non-aqueous secondary battery functional layer, a separator including a functional layer, a negative electrode, a positive electrode, and a secondary battery were produced, and various evaluations were performed in the same way as in Example 5 with the exception that melamine cyanurate C was not used and the amount of the binder (polymer B) was set as 100 parts in production of the slurry composition for a non-aqueous secondary battery functional layer. The results are shown in Table 3.

Comparative Example 3

A binder, a slurry composition for a non-aqueous secondary battery functional layer, a separator including a functional layer, a negative electrode, a positive electrode, and a secondary battery were produced, and various evaluations were performed in the same way as in Example 1 with the exception that melamine cyanurate D (volume-average particle diameter: 1,000 nm) was used instead of melamine cyanurate A as a melamine compound in production of the slurry composition for a non-aqueous secondary battery functional layer. The results are shown in Table 3.

In Tables 1 to 3, shown below:

"PP" indicates separator substrate made from polypropylene;

"PE" indicates separator substrate made from polyethylene;

"CE" indicates separator substrate made from cellulose; and

"PEs" indicates separator substrate made from polyester.

TABLE 1

| | | | Example 1 | Example 2 | Example 3 | Example 4 |
|---|---|---|---|---|---|---|
| Shiny composition | Binder | Type | Polymer A | Polymer A | Polymer A | Polymer B |
| | | Functional groups | Carboxy group Nitrile group Epoxy group Hydroxyl group | Carboxy group Nitrile group Epoxy group Hydroxyl group | Carboxy group Nitrile group Epoxy group Hydroxyl group | Carboxy group Nitrile group Epoxy group Hydroxyl group |
| | | Carboxy group content [mmol/g] | 0.57 | 0.57 | 0.57 | 0.57 |
| | | Nitrile group content [mmol/g] | 2.57 | 2.57 | 2.57 | 2.57 |
| | | Volume-average particle diameter [nm] | 190 | 190 | 190 | 50 |
| | | Glass-transition temperature [° C.] | −40 | −40 | −40 | −40 |
| | | Amount [parts by mass] | 50 | 50 | 50 | 50 |
| | Melamine compound | Type | Melamine cyanurate A | Melamine cyanurate A | Melamine cyanurate B | Melamine cyanurate C |
| | | Volume-average particle diameter [nm] | 190 | 190 | 270 | 50 |
| | | Amount [parts by mass] | 50 | 50 | 50 | 50 |
| | Non-conductive particles | Type | — | Alumina | — | — |
| | | Volume-average particle diameter [nm] | — | 300 | — | — |
| | | Amount [parts by mass] | — | 300 | — | — |
| Separator substrate | | Type | PP | PP | PP | PP |
| | | Structure | Microporous membrane | Microporous membrane | Microporous membrane | Microporous membrane |
| | | Presence of dried product in inner part | No | No | No | No |
| Close adherence | | | A | A | B | A |
| Permeability | | | A | A | A | A |
| Rate characteristics | | | A | A | C | A |
| Cycle characteristics | | | A | A | A | A |

| | | | Example 5 | Example 6 | Example 7 | Example 8 |
|---|---|---|---|---|---|---|
| Shiny composition | Binder | Type | Polymer B | Polymer B | Polymer A | Polymer B |
| | | Functional groups | Carboxy group Nitrile group Epoxy group Hydroxyl group | Carboxy group Nitrile group Epoxy group Hydroxyl group | Carboxy group Nitrile group Epoxy group Hydroxyl group | Carboxy group Nitrile group Epoxy group Hydroxyl group |
| | | Carboxy group content [mmol/g] | 0.57 | 0.57 | 0.57 | 0.57 |
| | | Nitrile group content [mmol/g] | 2.57 | 2.57 | 2.57 | 2.57 |
| | | Volume-average particle diameter [nm] | 50 | 50 | 190 | 50 |
| | | Glass-transition temperature [° C.] | −40 | −40 | −40 | −40 |
| | | Amount [parts by mass] | 50 | 50 | 50 | 50 |
| | Melamine compound | Type | Melamine cyanurate C | Melamine cyanurate C | Ammeline A | Ammeline B |
| | | Volume-average particle diameter [nm] | 50 | 50 | 190 | 50 |
| | | Amount [parts by mass] | 50 | 50 | 50 | 50 |
| | Non-conductive particles | Type | — | Alumina | — | — |
| | | Volume-average particle diameter [nm] | — | 25 | — | — |
| | | Amount [parts by mass] | — | 300 | — | — |

TABLE 1-continued

| Separator substrate | Type | PE | PE | PP | PE |
|---|---|---|---|---|---|
| | Structure | Microporous membrane | Microporous membrane | Microporous membrane | Microporous membrane |
| | Presence of dried product in inner part | Yes | Yes | No | Yes |
| Close adherence | | A | A | C | C |
| Permeability | | A | A | A | A |
| Rate characteristics | | A | A | A | A |
| Cycle characteristics | | A | A | A | A |

TABLE 2

| | | | Example 9 | Example 10 | Example 11 | Example 12 |
|---|---|---|---|---|---|---|
| Slurry composition | Binder | Type | Polymer A | Polymer B | Polymer A | Polymer A |
| | | Functional groups | Carboxy group Nitrile group Epoxy group Hydroxyl group | Carboxy group Nitrile group Epoxy group Hydroxyl group | Carboxy group Nitrile group Epoxy group Hydroxyl group | Carboxy group Nitrile group Epoxy group Hydroxy l group |
| | | Carboxy group content [mmol/g] | 0.57 | 0.57 | 0.57 | 0.57 |
| | | Nitrile group content [mmol/g] | 2.57 | 2.57 | 2.57 | 2.57 |
| | | Volume-average particle diameter [nm] | 190 | 50 | 190 | 190 |
| | | Glass-transition temperature [° C.] | −40 | −40 | −40 | −40 |
| | | Amount [parts by mass] | 50 | 50 | 85 | 20 |
| | Melamine compound | Type | Melamine A | Melamine B | Melamine cyanurate A | Melamine cyanurate A |
| | | Volume-average particle diameter [nm] | 190 | 50 | 190 | 190 |
| | | Amount [parts by mass] | 50 | 50 | 15 | 80 |
| | Non-conductive particles | Type | — | — | — | — |
| | | Volume-average particle diameter [nm] | — | — | — | — |
| | | Amount [parts by mass] | — | — | — | — |
| Separator substrate | | Type | PP | PE | PP | PP |
| | | Structure | Microporous membrane | Microporous membrane | Microporous membrane | Microporous membrane |
| | | Presence of dried product in inner part | No | Yes | No | No |
| Close adherence | | | C | C | A | C |
| Permeability | | | A | A | B | A |
| Rate characteristics | | | A | A | B | A |
| Cycle characteristics | | | C | C | B | A |

| | | | Example 13 | Example 14 | Example 15 | Example 16 |
|---|---|---|---|---|---|---|
| Slurry composition | Binder | Type | Polymer C | Polymer C | Polymer C | Polymer C |
| | | Functional groups | Carboxy group Nitrile group Epoxy group Hydroxyl group | Carboxy group Nitrile group Epoxy group Hydroxyl group | Carboxy group Nitrile group Epoxy group Hydroxyl group | Carboxy group Nitrile group Epoxy group Hydroxyl group |
| | | Carboxy group content [mmol/g] | 0.57 | 0.57 | 0.57 | 0.57 |
| | | Nitrile group content [mmol/g] | 2.57 | 2.57 | 2.57 | 2.57 |
| | | Volume-average particle diameter [nm] | 200 | 200 | 200 | 200 |
| | | Glass-transition temperature [° C.] | −54 | −54 | −54 | −54 |
| | | Amount [parts by mass] | 50 | 50 | 50 | 50 |
| | Melamine compound | Type | Coupling-treated melamine cyanurate A | Coupling-treated melamine cyanurate A | Melamine cyanurate A | Coupling-treated melamine cyanurate B |
| | | Volume-average particle diameter [nm] | 190 | 190 | 190 | 270 |
| | | Amount [parts by mass] | 50 | 50 | 50 | 50 |
| | Non-conductive particles | Type | — | Alumina | Alumina | Alumina |
| | | Volume-average particle diameter [nm] | — | 300 | 300 | 300 |
| | | Amount [parts by mass] | — | 300 | 300 | 300 |
| Separator substrate | | Type | PP | PP | PP | PP |
| | | Structure | Non-woven fabric | Non-woven fabric | Non-woven fabric | Non-woven fabric |

TABLE 2-continued

|  |  | | | | |
|---|---|---|---|---|---|
|  | Presence of dried product in inner part | Yes | Yes | Yes | Yes |
| Close adherence | | A | A | B | B |
| Permeability | | A | A | A | A |
| Rate characteristics | | A | A | B | A |
| Cycle characteristics | | A | A | A | A |

TABLE 3

| | | | Example 17 | Example 18 | Example 19 | Example 20 |
|---|---|---|---|---|---|---|
| Shiny composition | Binder | Type | Polymer C | Polymer A | Polymer A | Polymer C |
| | | Functional groups | Carboxy group Nitrile group Epoxy group Hydroxyl group | Carboxy group Nitrile group Epoxy group Hydroxyl group | Carboxy group Nitrile group Epoxy group Hydroxyl group | Carboxy group Nitrile group Epoxy group Hydroxyl group |
| | | Carboxy group content [mmol/g] | 0.57 | 0.57 | 0.57 | 0.57 |
| | | Nitrile group content [mmol/g] | 2.57 | 2.57 | 2.57 | 2.57 |
| | | Volume-average particle diameter [nm] | 200 | 190 | 190 | 200 |
| | | Glass-transition temperature [° C.] | −54 | −40 | −40 | −54 |
| | | Amount [parts by mass] | 50 | 50 | 50 | 50 |
| | Melamine compound | Type | Coupling-treated melamine cyanurate C | Coupling-treated melamine cyanurate A | Melamine cyanurate A | Coupling-treated melamine cyanurate A |
| | | Volume-average particle diameter [nm] | 50 | 190 | 190 | 190 |
| | | Amount [parts by mass] | 50 | 50 | 50 | 50 |
| | Non-conductive particles | Type | Alumina | — | — | — |
| | | Volume-average particle diameter [nm] | 300 | — | — | — |
| | | Amount [parts by mass] | 300 | — | — | — |
| Separator substrate | | Type | PP | PP | PP | CE |
| | | Structure | Non-woven fabric | Non-woven fabric | Non-woven fabric | Non-woven fabric |
| | | Presence of dried product in inner part | Yes | Yes | Yes | Yes |
| Close adherence | | | B | B | B | A |
| Permeability | | | B | A | A | A |
| Rate characteristics | | | B | A | A | A |
| Cycle characteristics | | | A | A | A | A |

| | | | Example 21 | Comparative Example 1 | Comparative Example 2 | Comparative Example 3 |
|---|---|---|---|---|---|---|
| Shiny composition | Binder | Type | Polymer C | Polymer A | Polymer B | Polymer A |
| | | Functional groups | Carboxy group Nitrile group Epoxy group Hydroxyl group | Carboxy group Nitrile group Epoxy group Hydroxyl group | Carboxy group Nitrile group Epoxy group Hydroxyl group | Carboxy group Nitrile group Epoxy group Hydroxyl group |
| | | Carboxy group content [mmol/g] | 0.57 | 0.57 | 0.57 | 0.57 |
| | | Nitrile group content [mmol/g] | 2.57 | 2.57 | 2.57 | 2.57 |
| | | Volume-average particle diameter [nm] | 200 | 190 | 50 | 190 |
| | | Glass-transition temperature [° C.] | −54 | −40 | −40 | −40 |
| | | Amount [parts by mass] | 50 | 100 | 100 | 50 |
| | Melamine compound | Type | Coupling-treated melamine cyanurate A | — | — | Melamine cyanurate D |
| | | Volume-average particle diameter [nm] | 190 | — | — | 1000 |
| | | Amount [parts by mass] | 50 | — | — | 50 |
| | Non-conductive particles | Type | — | — | — | — |
| | | Volume-average particle diameter [nm] | — | — | — | — |
| | | Amount [parts by mass] | — | — | — | — |
| Separator substrate | | Type | PEs | PP | PE | PP |
| | | Structure | Non-woven fabric | Microporous membrane | Microporous membrane | Microporous membrane |

TABLE 3-continued

| | | | | |
|---|---|---|---|---|
| Presence of dried product in inner part | Yes | No | Yes | No |
| Close adherence | B | D | D | D |
| Permeability | A | D | E | B |
| Rate characteristics | B | D | D | D |
| Cycle characteristics | A | D | D | D |

It can be seen from Tables 1 to 3 that in Examples 1 to 21 in which the used slurry composition contained a binder including a specific functional group and a melamine compound having a volume-average particle diameter within a specific range and in which the amount of the melamine compound among the total of the binder and the melamine compound was within a specific range, it was possible to closely adhere a functional layer and a separator substrate strongly and to produce a separator having excellent permeability. Moreover, it was possible to cause a secondary battery to display excellent rate characteristics and cycle characteristics using the separator.

On the other hand, it can be seen from Table 3 that in Comparative Examples 1 and 2 in which the used binder composition contained a binder but did not contain a melamine compound, it was not possible to cause strong close adherence between a functional layer and a separator substrate of a separator, and permeability of the separator decreased. Moreover, it was not possible to cause a secondary battery to display excellent rate characteristics and cycle characteristics using the separator.

Furthermore, it can be seen from Table 3 that in Comparative Example 3 in which the used melamine compound had a volume-average particle diameter exceeding a specific value, it was not possible to cause strong close adherence between a functional layer and a separator substrate of a separator, and it was not possible to cause a secondary battery to display excellent rate characteristics and cycle characteristics using the separator.

INDUSTRIAL APPLICABILITY

According to the present disclosure, it is possible to provide a slurry composition for a non-aqueous secondary battery functional layer that can form a functional layer capable of closely adhering strongly to a separator substrate and that can enhance rate characteristics of a non-aqueous secondary battery including a separator that includes the functional layer.

Moreover, according to the present disclosure, it is possible to provide a separator for a non-aqueous secondary battery in which a functional layer and a separator substrate are closely adhered strongly and that can cause a non-aqueous secondary battery to display excellent rate characteristics.

Furthermore, according to the present disclosure, it is possible to provide a non-aqueous secondary battery having excellent rate characteristics.

The invention claimed is:

1. A slurry composition for a non-aqueous secondary battery functional layer comprising a binder and a melamine compound, wherein
the binder is a polymer including at least one functional group selected from the group consisting of a carboxy group, a hydroxyl group, an amino group, an epoxy group, an oxazoline group, a sulfo group, a nitrile group, and an amide group,
the binder has a volume-average particle diameter of not less than 20 nm and not more than 300 nm,
the melamine compound has a volume-average particle diameter of not less than 20 nm and not more than 300 nm, where the volume-average particle diameter is measured by laser diffraction and determined as a particle diameter at which a cumulative undersize calculated from a small diameter end of a particle diameter distribution by volume measured by the later diffraction reaches 50%,
the melamine compound constitutes a proportion of not less than 0.5 mass % and not more than 85 mass % among a total of the binder and the melamine compound.

2. The slurry composition for a non-aqueous secondary battery functional layer according to claim 1, further comprising non-conductive particles.

3. A separator for a non-aqueous secondary battery comprising: a separator substrate; and a functional layer on the separator substrate, wherein
the functional layer is a dried product of the slurry composition for a non-aqueous secondary battery functional layer according to claim 1.

4. The separator for a non-aqueous secondary battery according to claim 3, wherein a portion of the dried product encroaches into the separator substrate.

5. The separator for a non-aqueous secondary battery according to claim 3, wherein the separator substrate is a microporous membrane containing either or both of a polyolefin resin and an aromatic polyamide resin or a non-woven fabric containing either or both of a polyolefin resin and an aromatic polyamide resin.

6. A non-aqueous secondary battery comprising a positive electrode, a negative electrode, a separator, and an electrolyte solution, wherein
the separator is the separator for a non-aqueous secondary battery according to claim 4.

7. The slurry composition for a non-aqueous secondary battery functional layer according to claim 1, wherein the polymer is at least one selected from the group consisting of
a polymer including a carboxy group and a hydroxyl group;
a polymer including a carboxy group and an amide group;
a polymer including a carboxy group, a nitrile group, and an amino group; and
a polymer including a carboxy group, an epoxy group, a hydroxyl group, and a nitrile group.

8. The slurry composition for a non-aqueous secondary battery functional layer according to claim 1, wherein the polymer is at least one selected from the group consisting of
a polymer including a carboxy group-containing monomer unit and a hydroxyl group-containing monomer unit;
a polymer including a carboxy group-containing monomer unit and an amide group-containing monomer unit;
a polymer including a carboxy group-containing monomer unit, a nitrile group-containing monomer unit, and an amino group-containing monomer unit; and a polymer including a carboxy group-containing monomer unit, an epoxy group-containing monomer unit, a hydroxyl group-containing monomer unit, and a nitrile group-containing monomer unit.

9. The slurry composition for a non-aqueous secondary battery functional layer according to claim 1, further comprising a solvent, wherein the solvent is water.

* * * * *